C. A. HEALEY.
GUARD PLATE FOR HAY RAKES.
APPLICATION FILED JUNE 8, 1917.
1,262,340.
Patented Apr. 9, 1918.
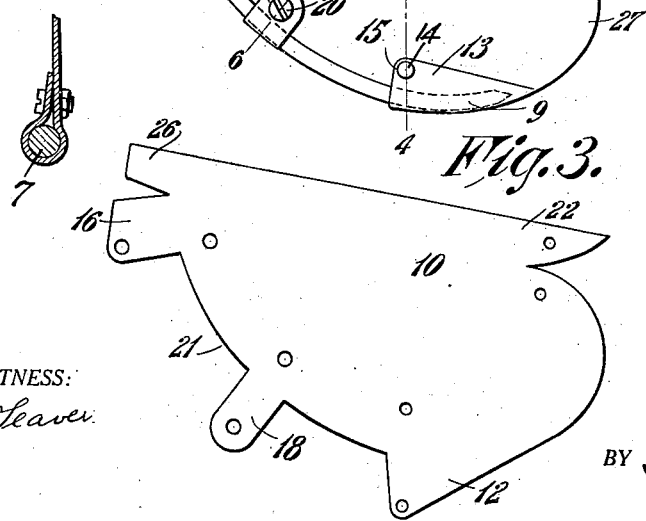

UNITED STATES PATENT OFFICE.

CLINTON A. HEALEY, OF WESTFIELD, MASSACHUSETTS.

GUARD-PLATE FOR HAY-RAKES.

1,262,340.  Specification of Letters Patent.  Patented Apr. 9, 1918.

Application filed June 8, 1917. Serial No. 173,617.

*To all whom it may concern:*

Be it known that I, CLINTON A. HEALEY, a citizen of the United States of America, and resident of Westfield, in the county of Hampden and State of Massachusetts, have invented certain new and useful Improvements in Guard-Plates for Hay-Rakes, of which the following is a full, clear, and exact description.

The object of the present invention is to provide a guard plate adapted to be secured to the end tooth of a horse hay rake on each side thereof for preventing the hay from escaping from the rake, and which device is very simply and cheaply constructed from a blank of sheet metal by merely bending over certain portions to engage frictionally with an ordinary form of arc shaped tooth, and which will possess a large amount of strength and rigidity, yet which will not have projecting portions likely to interfere with its proper use, and cause accumulation of the material.

In the accompanying drawings showing one embodiment of my invention,

Figure 1 is a plan view of a single tooth with the guard attached.

Fig. 2 is a side elevation of the same.

Fig. 3 shows a blank for the guard before bending into shape for attachment.

Fig. 4 is a section enlarged, on the line 4—4, Fig. 2.

Fig. 5 is an enlarged section on the line 5—5, Fig. 2, and

Fig. 6 is a section enlarged, on the line 6—6, Fig. 2.

In the drawings, 7 represents an ordinary curved or arc shaped tooth as generally used in hay rakes, which may have a bend 8 at one end for attachment to the frame, the other end 9 having the usual sharp point.

The attachment is shown in the form of a segment shaped plate 10 formed of suitable sheet metal such as iron or steel, and is provided with an angular extension 12 adapted to be bent over to form a socket 13, as indicated in Fig. 2 and Fig. 4, and may be secured in this position by a rivet 14.

This socket is open at 15 to receive the pointed extremity of the tooth, while the other portion is made tapering to close on the sharp end of the rake.

At this upper portion the plate is provided with an ear or lug 16 that is bent over the tooth 7 and suitably secured as by bolt 17 to form an eye inclosing the tooth.

If desired, another ear 18 may be provided that is bent over to form a loop 19 secured by a bolt 20, whereby the tooth is secured to the curved margin 21 of the segment shaped plate.

The straight edge or chord portion of the plate is provided with an extension 22 along the entire edge, that is double backed along the line 23 to form a kind of rib 24 at this portion that will serve greatly to strengthen the plate and prevent bending at the edge opposite that to which the rake tooth is secured, as indicated in Fig. 4 and other views.

At one end this double portion may be secured by a rivet 25. At the other end the ear 26 is provided that is bent around the said ear 16 as shown in Figs. 2 and 5, which will serve to strengthen the reinforced portion or rib 24; and also to provide additional fastening means for the guard on the rake teeth at this end.

It will thus be understood that an attachment of this character is very readily formed by cutting the blank out of sheet metal and forming the socket 13 and the rib 24.

The loops at 16 and 18 are bent over and also the eye 26, but the bolts therefor are not securely locked. Thereupon, the rake tooth 7 can be readily inserted through the two loops and the extremity caused to enter the socket 13. Then the two bolts for the eyes are screwed up tight and the guard is very securely attached to the rake tooth.

It will be seen that the forward edge 27 of the guard is curved and will not interfere with its proper use or accumulate the hay and grass, and that no sharp points or projections are found in the device to interfere with its efficient use.

The guard can be readily attached to the usual or conventional form of rake tooth without any change in its construction and is applied merely by the use of a wrench or screw driver.

Having thus described my invention, what I claim is:—

1. A guard plate for hay-rakes, comprising a segment plate having one edge curved to correspond with the rake tooth, the plate having an ear on such edge forming a socket to receive the tooth extremity, and a lug on the plate on such edge to inclose and secure the tooth.

2. A guard plate for hay-rakes, comprising a segment plate having one edge curved to correspond with the rake tooth, the plate having an ear on such edge forming a socket to receive the tooth extremity, and a lug on the plate on such edge to inclose and secure the tooth, the edge opposite the curved edge being folded back to form a closed loop to strengthen the plate.

3. A guard plate for hay-rakes, comprising a segment plate having one edge curved to correspond with the rake tooth, the plate having an ear on such edge, the plate to form a socket to receive the tooth extremity, and a lug on the plate on such edge to inclose and secure the tooth, the edge opposite the curved edge being folded back to form a closed loop to strengthen the plate, said curved edge being extended to form an ear embracing the tooth, said ear being secured to the plate.

4. A guard plate for hay-rakes, comprising a segment plate having one edge curved to correspond with the rake tooth, the plate having an ear on such edge forming a socket to receive the tooth extremity, a lug on the plate on such edge to inclose and secure the tooth, the edge opposite the curved edge being folded back to form a closed loop to strengthen the plate, said curved edge being extended to form an ear embracing the tooth and secured to the plate, said ear being a lug on the plate bent around the tooth at the same place and secured in position.

5. A guard plate for hay-rakes, comprising a segment plate having one edge curved to correspond with the rake tooth, the plate having an ear on such edge forming a socket to receive the tooth extremity, a lug on the plate on such edge to inclose and secure the tooth, the edge opposite the curved edge being folded back to form a closed loop to strengthen the plate, said curved edge being extended to form an ear embracing the tooth and secured to the plate, said ear being a lug on the plate bent around the tooth at the same place and secured in position, and a lug bent around the tooth at the middle part of the plate.

6. A guard plate to be secured to a rake tooth, consisting of a plate having a socket adapted to receive the pointed end of a rake tooth and a plurality of ears adapted to embrace the rake tooth and be secured to the plate, whereby said plate will be locked to said tooth and the pointed tooth end will be inclosed.

Signed by me at Springfield, Mass., in presence of a subscribing witness.

CLINTON A. HEALEY.

Witness:
G. R. DRISCOLL.

Copies of this patent may be obtained for five cents each, by addressing the "Commissioner of Patents, Washington, D. C."